United States Patent [19]

Miedema

[11] 4,039,947
[45] Aug. 2, 1977

[54] PROTECTION SWITCHING SYSTEM FOR MICROWAVE RADIO

[75] Inventor: Hotze Miedema, Boxford, Mass.

[73] Assignee: Bell Telephone Laboratories, Incorporated, Murray Hill, N.J.

[21] Appl. No.: 700,833

[22] Filed: June 29, 1976

[51] Int. Cl.² .............................................. H04B 1/60
[52] U.S. Cl. ............................................ 325/2; 325/3; 340/147 SC
[58] Field of Search ................. 325/2, 3, 5, 40, 52, 325/65, 156, 158; 343/200, 205–208; 340/147 SC

[56] References Cited

U.S. PATENT DOCUMENTS

| 2,597,043 | 5/1952 | Treadwell | 325/2 |
| 2,699,495 | 1/1955 | Magnuski et al. | 325/2 |
| 3,111,624 | 11/1963 | Farkas | 325/3 X |
| 3,681,694 | 8/1972 | Sarati | 325/2 |

Primary Examiner—Benedict V. Safourek
Attorney, Agent, or Firm—Bryan W. Sheffield

[57] ABSTRACT

A protection switching system for microwave radio employs a frequency-agile-repeater (FAR) which is automatically re-tuned to the frequency of a failed repeater. A shutter associated with the failed repeater reflects the input signal normally employed by the failed repeater into the FAR, while the output of the FAR is reflected by a second shutter into the transmitting antenna.

8 Claims, 4 Drawing Figures

PROTECTION SWITCHING SYSTEM FOR MICROWAVE RADIO

BACKGROUND OF THE INVENTION

A. Field of the Invention

Broadly speaking, this invention relates to protection switching for microwave radio. More particularly, in a preferred embodiment, this invention relates to a protection switching system employing frequency-agile-repeaters.

B. Discussion of the Prior Art

As is well known, microwave radio systems are widely employed in the telecommunications industry. For example, the microwave radio system known as TD-3 operates in the 4 GHz common carrier band and derives up to 12, two-way radio channels, each capable of carrying up to 1500 voice-grade telephone circuits.

Obviously, the failure of an operational microwave channel, even for a few seconds, would have serious consequences and for that reason it has become standard in the industry to provide a protection switching arrangement for every operational microwave system. The most common form of protection switching is the so-called, "hot standby" arrangement wherein one or more of the working microwave channels are withheld from service and kept idle, ready to be brought into service the moment that one of the working channels fails or becomes marginal.

The increasing congestion in the common carrier bands, and recent rulings by the Federal Communications Commission, have led to a re-examination of this approach to the provision of protection switching. One proposal is to use all the channels in a given system for traffic purposes and to provide a duplicate set of standby equipment for each working channel, switching to the standby equipment if and when the regular equipment fails. While the above approach is efficient in terms of spectrum usage, it is extremely inefficient in terms of cost and space requirements and is, thus, not economically viable. Another proposal is to provide only one spare repeater and to substitute that repeater for a failed repeater, as required. Of course, each time that the standby repeater was placed in service it would be necessary to re-tune the repeater to the transmitting and receiving frequencies of the failed repeater. Such re-tunable repeaters, known in the industry as frequency-agile-repeaters, are commercially available and can be easily re-tuned, by remote control if desired, well within the time limits established for the protection switching scheme.

Unfortunately, there is more to a multichannel microwave system than the repeaters. Typically, such systems also include channel-separating networks, channel-combining networks, filters, circulators, etc., all of which must also be carefully tuned to the frequency of the microwave channel that they are associated with. This tuning is a slow and painstaking operation and cannot be done fast enough to meet the switching limits speed of the protection switching scheme. In other words, while a frequency-agile-repeater per se can be re-tuned fast enough to meet the requirements of a protection switching system, the associated "plumbing," in general, cannot.

SUMMARY OF THE INVENTION

Fortunately, the above and other problems have been solved by the instant invention which, in a preferred embodiment, comprises an improved microwave protection switching system of the type that includes a receiving antenna; a transmitting antenna; a plurality of channel separating networks connected to the receiving antenna; a plurality of channel-combining networks connected to the transmitting antenna; and a corresponding plurality of microwave repeaters respectively interconnecting the channel separating and combining networks, each of the repeaters being tuned to a uniquely assigned pair of transmitting and receiving frequencies. The improvement according to the invention comprises a corresponding plurality of remotely operable input and output shutters respectively associated with the input and output circuits of the microwave repeaters; a frequency-agile-repeater remotely tunable to any of the pairs of frequencies; means for connecting the frequency-agile-repeater to the receiving and transmitting antennas; means, connected to each of the microwave repeaters, for monitoring the performance thereof and for generating an alarm signal when any one of the repeaters fails or becomes marginal; and means, responsive to the alarm signal, for closing the input and output shutters associated with the failed repeater and for simultaneously re-tuning the frequency-agile-repeater to the transmitting and receiving frequencies of the failed repeater whereby the microwave signal normally repeatered by the failed repeater is repeatered by the frequency-agile-repeater.

The invention and its mode of operation will be more fully comprehended from the following detailed description, when taken with the appended drawings, in which:

DETAILED DESCRIPTION OF THE INVENTION

Figure 1:
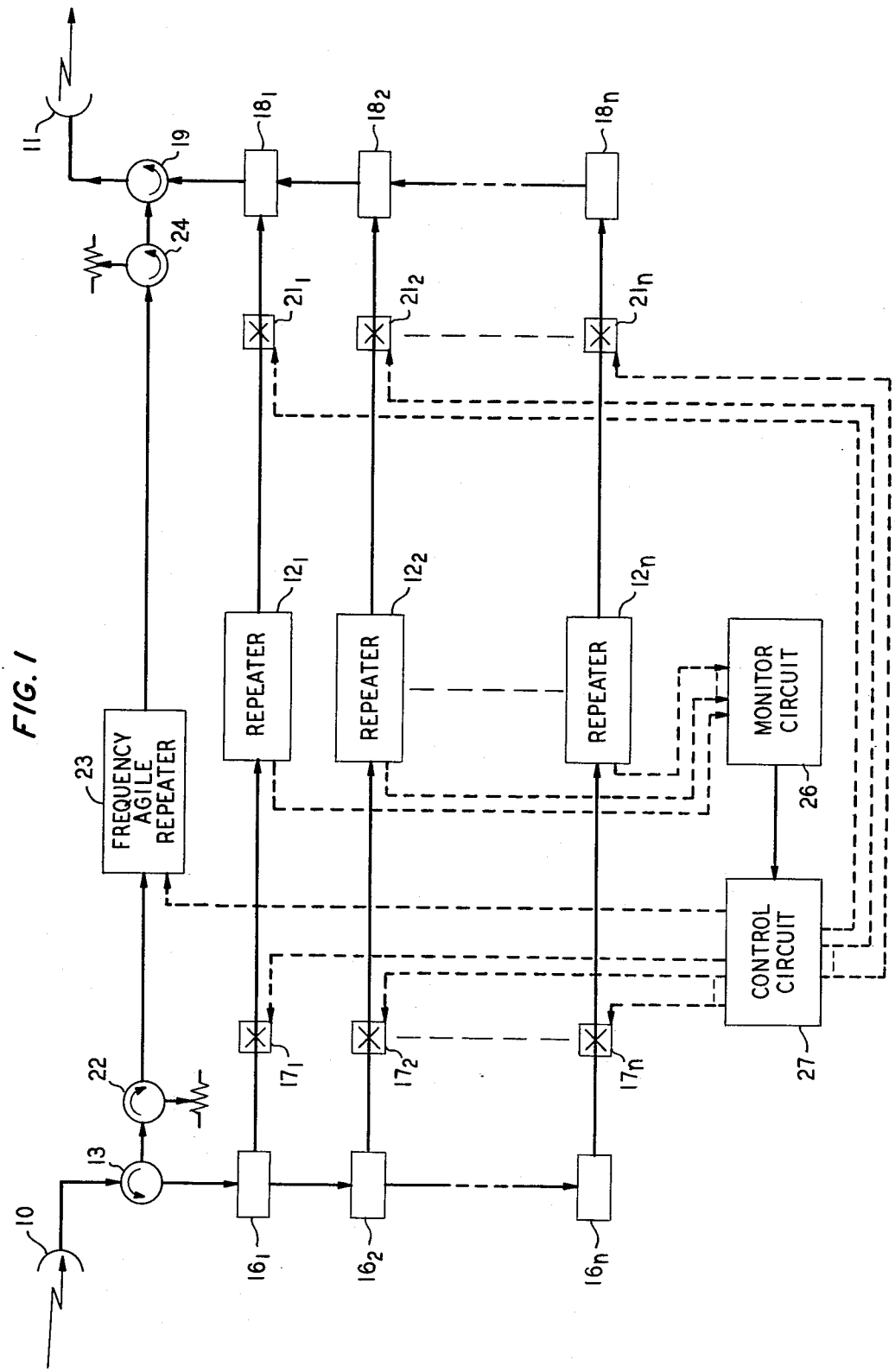
FIG. 1 is a schematic diagram of an illustrative protection switching system using a frequency-agile-repeater according to the invention.

FIG. 1 depicts a typical, n-channel, microwave repeater station according to the invention. To simplify the drawing, only one direction of transmission is shown; however, the other direction is entirely analogous and, thus, will not be discussed in detail.

As shown, the repeater station includes a receiving antenna 10, a transmitting antenna 11, and $n$ microwave repeaters $12_1 - 12_n$ connected therebetween. More specifically, the signals received by antenna 10 are connected to a circulator 13, thence to a plurality of channel separation networks $16_1 - 16_n$, each of which is tuned to the appropriate channel frequency of the corresponding repeater. A plurality of shutters $17_1 - 17_n$ are respectively interposed between the channel separation networks $16_1 - 16_n$ and the repeaters $12_1 - 12_n$. In like fashion, the outputs of the repeaters are connected, via a plurality of appropriately-tuned channel-combining networks $18_1 - 18_n$ to a circulator 19, thence to antenna 11. A plurality of shutters $21_1 - 21_n$ are respectively interposed between repeaters $12_1 - 12_n$ and the channel-combining networks $18_1 - 18_n$. A circulator 22 connects circulator 13 to the input of a frequency-agile-repeater (FAR) 23, that is to say a repeater which is characterized by the ability to be rapidly re-tuned to any of the operating frequencies employed by repeaters $12_1 - 12_n$. The output of the FAR is connected to circulator 19 via another circulator 24. A monitor circuit 26 is connected to each of the repeaters $12_1 - 12_n$ to monitor the operation thereof. A control circuit 27, connected to the output of monitor circuit 26, is connected to each of shutters $17_1 - 17_n$ and each of shutters $21_1 - 21_n$ to operate the same. Control circuit 27 is also connected to FAR 23 to alter the frequency thereof, as will be explained below.

In operation, assume that all of the repeaters $12_1 - 12_n$ are operating satisfactorily. The incoming signals from antenna 10 will pass through circulator 13 and the appropriate channel separation networks $16_1 - 16_n$ for amplification in the repeaters. The amplified signals are then recombined, one at a time, in channel-combining networks $18_1 - 18_n$ and pass through circulator 19 to antenna 11, thence to the next repeater station. Assume now that one of the repeaters, repeater $12_2$ for example, ceases to operate satisfactorily. Monitor circuit 26 will immediately detect this failure and signal control circuit 27 to close shutters $17_2$ and $21_2$, the shutters associated with the input and output of repeater $12_2$. At the same time the control circuit generates the signal to re-tune FAR 23 to the appropriate transmit and receive frequency of the failed repeater.

Closing input shutter $17_2$ causes the received signal to be reflected back through channel separation network $16_2$ into circulator 13, thence to circulator 22 and FAR 23. Only the frequency band of the failed repeater is reflected back into the FAR; thus this repeater, in effect, uses the channel separation network of the failed channel. The suppression of unwanted signals provided this way reduces the linearity requirements of the input stages to repeater 23.

The output of all of the repeaters passes through circulator 19 when the frequency-agile-repeater is activated, for example by the failure of repeater $12_2$, the FAR output passes through circulators 24 and 19 into frequency combining network $18_2$. There it is reflected by shutter $21_2$ back towards circulator 19 and from there into antenna 11. Here, too, the channel-combining network of the failed channel is automatically used by the frequency-agile-repeater.

The extra signal attenuation introduced by the arrangement shown in FIG. 1 is limited to two passes through a circulator; that is, circulator 13 in the receiver and circulator 19 in the transmitter for the signals carried by the regular repeaters. The associated losses are approximately 0.1 dB per pass at 6 GHz and proportionately higher at higher frequencies. The frequency-agile-repeater experiences a somewhat higher input and output attenuation. Assuming perfect reflection at both the input and output shutters, the additional attenuation that the receive signal is subject to is about 1.4 dB. This figure represents one pass through the channel separation network (1.2 dB) and one pass each through circulators 13 and 22 at 0.1 dB per pass. The additional attenuation that the transmitted signal is subjected to is about 1.0 dB; that is, 0.8 dB from the channel-combining network and 0.1 dB from each of circulators 19 and 24.

Figure 2:
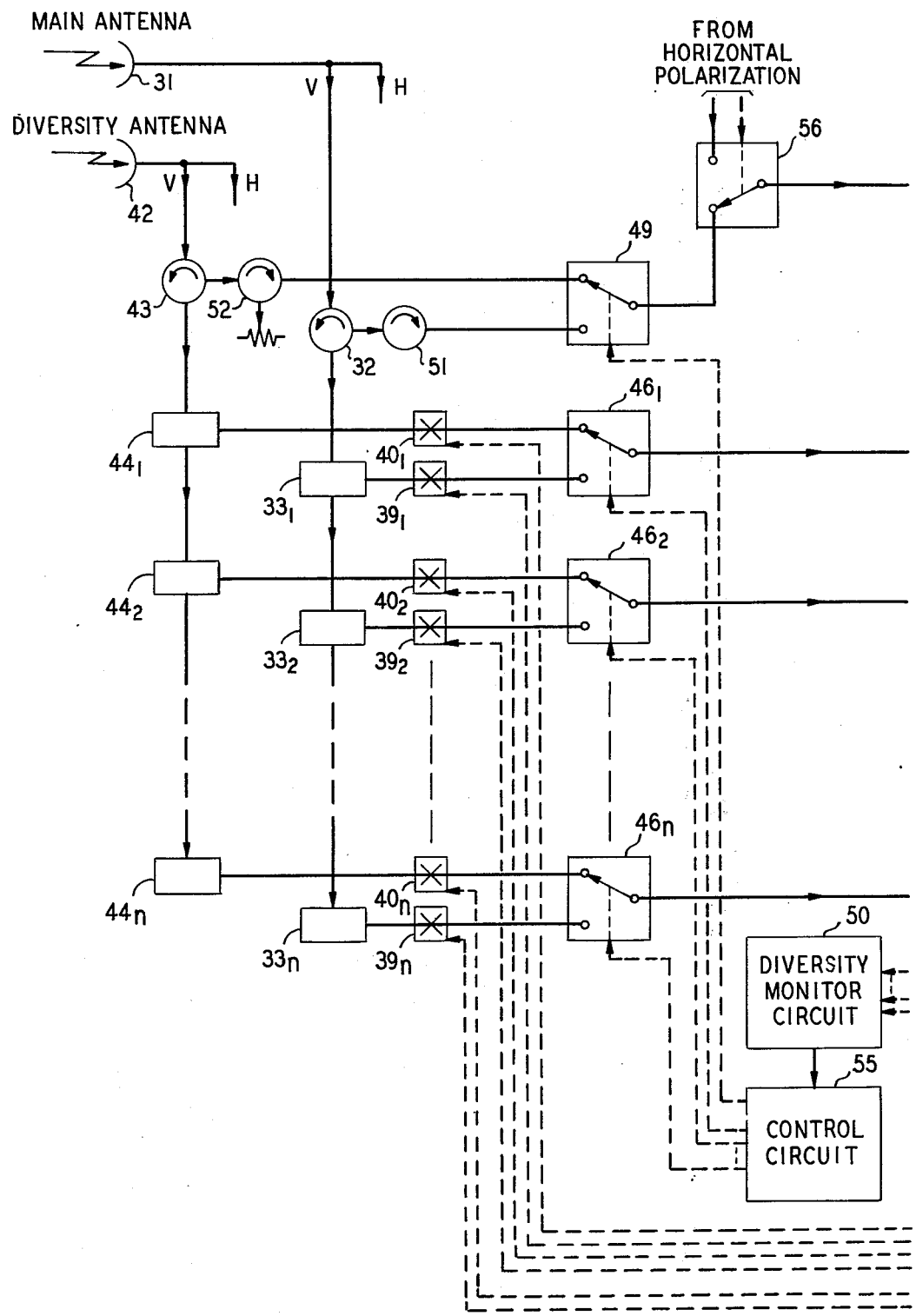
FIGS. 2 and 2A are a block schematic diagram of an alternate embodiment of the invention for use with microwave systems employing space diversity switching and dual polarization.
Figure 2A:
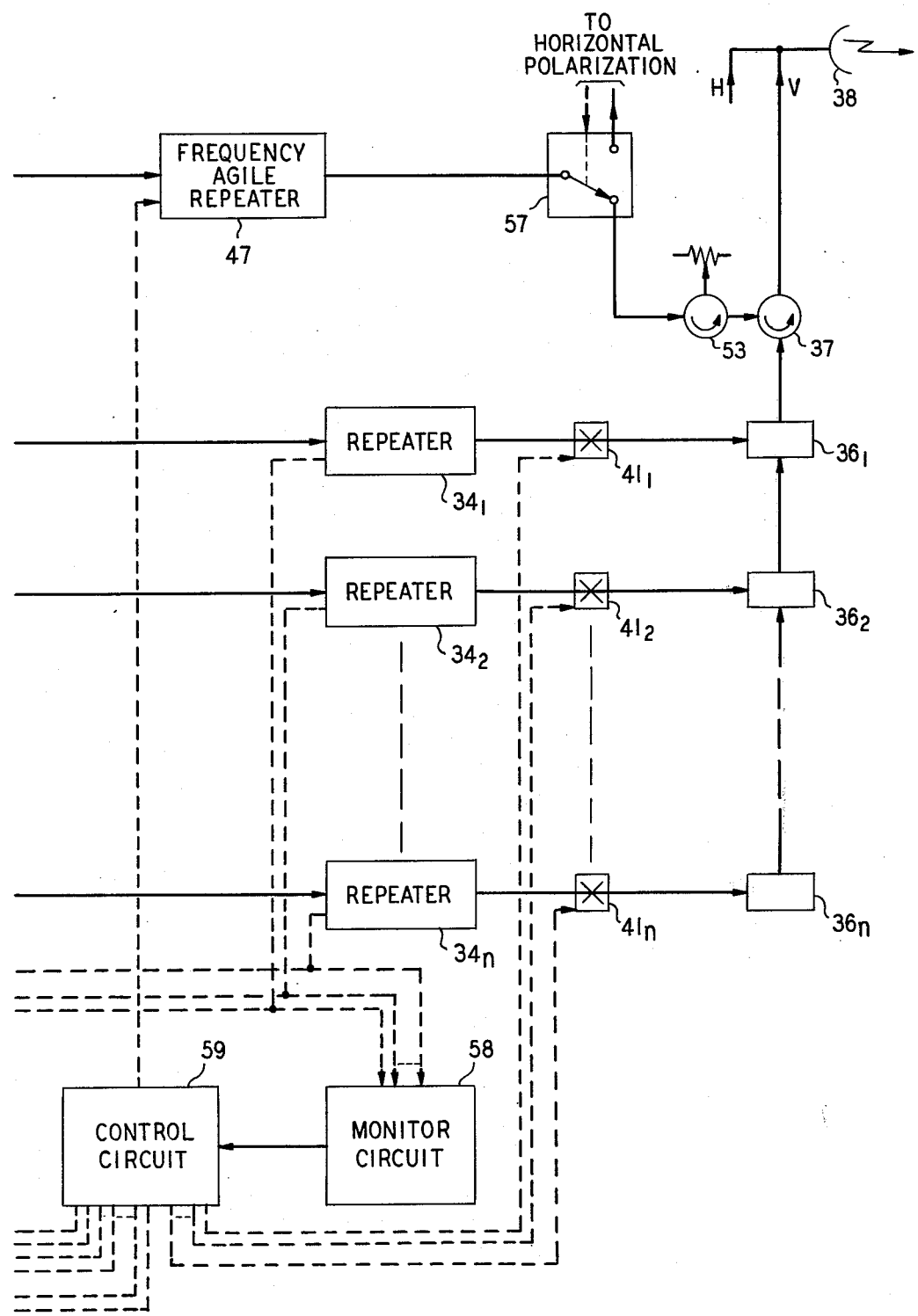

FIGS. 2 and 2A depict a modification of FIG. 1 which may be employed in repeater stations having space diversity switching. The circuitry shown also contemplates the simultaneous use of both horizontal and vertical polarizations, although only one polarization is shown.

Main antenna 31 is connected, via a circulator 32, to a plurality of channel separation networks $33_1 - 33_n$, thence to a corresponding plurality of microwave repeaters $34_1 - 34_n$. The outputs of the repeaters are combined in a plurality of combining networks $36_1 - 36_n$, and connected, via a circulator 37, to the transmitting antenna 38. A plurality of input and output shutters $39_1 - 39_n$ and $41_1 - 41_n$, are respectively connected between the repeaters and the associated separation and combining networks.

A space diversity antenna 42 is connected, via a circulator 43, to a second plurality of channel separation networks $44_1 - 44_n$, thence to repeaters $34_1 - 34_n$, via a second plurality of input shutters $40_1 - 40_n$ and one contact of a plurality of single-pole, double-throw diversity switches $46_1 - 46_n$. The other contacts of the diversity switches are connected to the channel separation networks $33_1 - 33_n$, via the shutters $39_1 - 39_n$. In a manner which is analogous to that shown in FIG. 1, a frequency-agile-repeater 47 is connected, via a diversity switch 49, to either circulator 51 or circulator 52, thence, via circulator 32 or 43, to either the main antenna 31 or the diversity antenna 42. In like fashion, the output of the FAR is connected, via a circulator 53, to circulator 37 and transmitting antenna 38. A pair of polarization switches 56 and 57, respectively connected at the input and output of FAR 47, may be used to associate the FAR with the horizontal polarization repeaters, if this is necessary. Repeaters $34_1 - 34_n$ are connected to a monitor circuit 58 which drives a control circuit 59 connected to each of the input and output shutter circuits. Repeaters $34_1 - 34_n$ are also connected to a diversity monitor circuit 50 which drives a control circuit 55 connected to the control terminals of the space diversity switches.

Note that shutters $39_1 - 39_n$ and $40_1 - 40_n$ could be replaced by a single set of shutters located between the diversity switches $46_1 - 46_n$ and the corresponding repeaters $34_1 - 34_n$. This would reduce by a factor of two the number of input shutters that are needed; however, in case of a repeater failure the reflected input signal would pass through the associated switch 46 twice. Thus, the received signal level would be reduced by an additional amount (approximately 2.5 dB).

In operation, monitor circuit 50 determines from the received signal levels whether the main antenna or the diversity antenna is to be connected to each of the repeaters and directs control circuit 55 to establish the appropriate connection, via switches $46_1 - 46_n$. As described in connection with FIG. 1, if one of the repeaters, for example repeater 2, should fail, this failure is detected by monitor circuit 58 which then directs control circuit 59 to operate the associated shutters, shutters $39_2$ and $40_2$ in the illustrative example, and to re-tune the FAR to the transmit and receive frequencies of the failed repeater. In a manner entirely analogous to that described with reference to FIG. 1, the incoming signal, on either the main or the diversity antenna, passes through the circulators and the appropriate channel selection networks, is reflected off the shutter back into the circulators, thence to the FAR. The shutter at the output side of the failed repeater correspondingly reflects the output from the FAR into the transmitting antenna. In this manner the FAR may be substituted for any repeater associated with the vertical polarization and, by operation of switches 56 and 57, may also be substituted for any failed repeater associated with the horizontal polarization circuitry. Of course, the FAR cannot be simultaneously substituted for failed repeaters in both portions of the circuitry, but such a simultaneous failure is fortunately rare.

Figure 3:
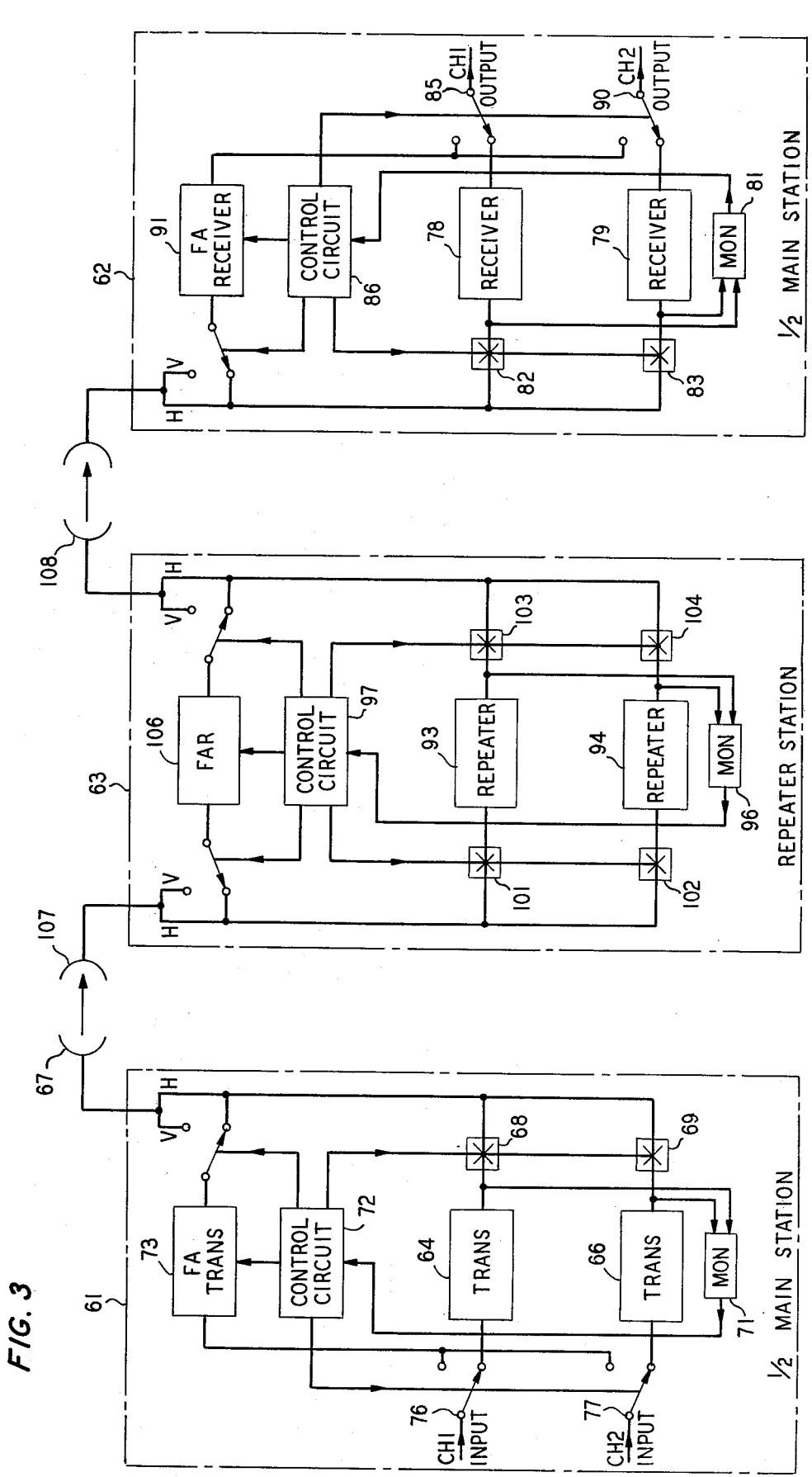
FIG. 3 is a simplified block schematic diagram of a protection switching system according to the invention showing both intermediate and terminal microwave stations.

FIG. 3 depicts a typical system configuration according to the invention. Again, to simplify the drawing only one direction of transmission and only one polarization are shown. Also, the channel-combining and spearating networks and the circulators have been omitted from this drawing although, of course, they are required.

As shown, the system comprises a transmitting station 61, a receiving station 62 and at least one intermediate repeater station 63. The transmitting station illustratively includes two microwave transmitters 64 and 66 connected to a transmitting antenna 67 via a pair of output shutters 68 and 69. Transmitters 64 and 66 are connected to a monitor circuit 71 which, in turn, is connected to a control circuit 72. A frequency-agile-transmitter 73 is connectible to antenna 67 by means of the output shutters 68 and 69, as discussed above with reference to FIGS. 1 and 2. Since transmitting station 61 is not an intermediate repeater station but one end of the transmission system, the connection of the input signals to the frequency-agile-transmitter is accomplished by means of switches 76 and 77, controlled by control circuit 72, rather than by input shutters.

Receiving station 62 is entirely analogous and comprises a pair of microwave receivers 78 and 79, a monitor circuit 81, a pair of input shutters 82 and 83, a control circuit 86 and a frequency-agile-receiver 91. Since station 62 is the other end of the transmission system, no output shutters are required and switch 85 or switch 90 connects the output of receiver 91 to the system output, if necessary.

Intermediate repeater station 63 comprises a pair of microwave repeaters 93 and 94, a monitor circuit 96, a control circuit 97 and a pair of input and a pair of output shutters 101, 102 and 103, 104, respectively. A frequency-agile-repeater 106 is connectible to receive antenna 107 and transmitting antenna 108 in the manner previously discussed with reference to FIGS. 1 and 2.

So far, the frequency-agile-repeaters have not been discussed in detail; however, these are commercially available items typically comprising a microwave amplifying circuit which may be re-tuned by adjusting the frequency of the local oscillator, for example by changing circuit components connected to the local oscillator via relay contacts.

One skilled in the art may make various changes and substitutions to the layout of parts shown without departing from the spirit and scope of the invention.

What I claim is:

1. An improved microwave protection switching system of the type that includes:
   a receiving antenna;
   a transmitting antenna;
   a plurality of channel-separating networks connected to said receiving antenna;
   a plurality of channel-combining networks connected to said transmitting antenna; and
   a corresponding plurality of microwave repeaters respectively interconnecting said channel separating and channel-combining networks, each of said repeaters being tuned to a uniquely assigned pair of transmitting and receiving frequencies, wherein the improvement comprises:
   a corresponding plurality of remotely operable input and output shutters respectively associated with the input and output circuits of said microwave repeaters;
   a frequency-agile-repeater remotely tunable to any of said pairs of frequencies;
   means for connecting said frequency-agile-repeater to said receiving and transmitting antennas;
   first means for monitoring the performance of each of said microwave repeaters and for generating a first alarm signal when any one of said repeaters fails or becomes marginal; and
   means, responsive to said first alarm signal, for closing the input and output shutters associated with the failed repeater and for simultaneously re-tuning said frequency-agile-repeater to the transmitting and receiving frequencies of said failed repeater, whereby the microwave signal normally repeatered by the failed repeater is repeatered by said frequency-agile-repeater.

2. The system according to claim 1 wherein said connecting means comprises:
   a first, three-port circulator connected between said receiving antenna and said channel separating networks;
   a second, three-port circulator having one port connected to said first circulator, a second port connected to the input circuit of said frequency-agile-repeater, and a third port terminated in a resistor;
   a third, three-port circulator connected between said channel-combining networks and said transmitting antenna; and
   a fourth, three-port circulator having one port connected to said third circulator, a second port connected to the output circuit of said frequency-agile-repeater and a third port terminated in a resistor.

3. The system according to claim 1 further comprising:
   a space diversity receiving antenna;
   a second plurality of channel separating networks connected to said space diversity antenna;
   a second plurality of remotely operable input shutters respectively connected to said second plurality of channel separating networks;
   a plurality of remotely operable switches for selectively associating a particular repeater with either said antenna or said space diversity antenna;
   second means for monitoring the performance of each of said microwave repeaters and for generating a second alarm signal when the level of the signal applied to the input thereof falls below some predetermined threshold;
   means responsive to said second alarm signal for activating the corresponding one of said plurality of remotely operable switches; and
   means for selectively connecting said frequency-agile-repeater to said space diversity antenna.

4. The system according to claim 3 wherein said selective connecting means comprises:
   a fifth, three-port circulator connected between said space diversity antenna and said second plurality of channel separating networks;
   a sixth, three-port circulator having a first port connected to said fifth circulator, a second port, and a third port terminated in a resistor; and switching means, connected to and controlled by said shutter closing means, for selectively connecting the input of said frequency-agile-repeater to the second port of either said sixth or said second circulator.

5. The system according to claim 1 wherein said receiving and transmitting antennas respectively receive and transmit microwave energy in first and second polarizations, said channel separating networks, channel-combining networks, microwave repeaters, input and output shutters, connecting means, monitoring means and shutter closing means are replicated for both of said polarizations; and said system further comprises:

means for switching and frequency-agile-repeater between the connecting means associated with said first and said second polarizations.

6. An improved microwave transmission system of the type that comprises:

a first main station including a microwave transmitting antenna and a plurality of microwave transmitters each operating at a different frequency connected to said antenna;

a second main station including a microwave receiving antenna and a plurality of microwave receivers each operating at a different frequency connected to said antenna; and at least one repeater station intermediate said first and second main stations, said repeater station including a microwave receiving antenna, a microwave transmitting antenna, and a plurality of microwave repeaters connected to said receiving and transmitting antennas, each repeater being tuned to the frequency of the corresponding transmitter and receiver in said first and second main stations, respectively, wherein the improvement comprises:

means for detecting the failure of any one of said plurality of transmitters;

a frequency-agile-transmitter;

means, responsive to said detecting means, for shuttering the output of said failed transmitter and for re-tuning said frequency-agile-transmitter to the transmitting frequency of the failed transmitter;

means, responsive to said detecting means, for associating the input signal normally connected to the input of the failed repeater with the input of said frequency-agile-transmitter; and means, responsive to said detecting means, for associating the output of said frequency-agile-transmitter with said transmitting antenna.

7. An improved microwave transmission system of the type that comprises:

a first main station including a microwave transmitting antenna and a plurality of microwave transmitters each operating at a different frequency connected to said antenna;

a second main station including a microwave receiving antenna and a plurality of microwave receivers each operating at a different frequency connected to said antenna; and at least one repeater station intermediate said first and second main stations, said repeater station including a microwave receiving antenna, a microwave transmitting antenna, and a plurality of microwave repeaters connected to said receiving and transmitting antennas, each repeater being tuned to the frequency of the corresponding transmitter and receiver in said first and second main stations, respectively, wherein the improvement comprises:

means for detecting the failure of any one of said plurality of receivers;

a frequency-agile-receiver;

means, responsive to said detecting means, for shuttering the input to said failed receiver and for re-tuning said frequency-agile-receiver to the receiving frequency of the failed receiver;

means, responsive to said detecting means, for associating the output circuit normally connected to the output of the failed receiver with the output of said frequency-agile-receiver; and means, responsive to said detecting means, for associating the input of said frequency-agile-receiver with said receiving antenna.

8. An improved microwave transmission system of the type that comprises:

a first main station including a microwave transmitting antenna and a plurality of microwave transmitters each operating at a different frequency connected to said antenna;

a second main station including a microwave receiving antenna and a plurality of microwave receivers each operating at a different frequency connected to said antenna; and at least one repeater station intermediate said first and second main stations, said repeater station including a microwave receiving antenna, a microwave transmitting antenna, and a plurality of microwave repeaters connected to said receiving and transmitting antennas, each repeater being tuned to the frequency of the corresponding transmitter and receiver in said first and second main stations, respectively, wherein the improvement comprises:

means for detecting the failure of any one of said plurality of repeaters;

a frequency-agile-repeater;

means, responsive to said detecting means, for shuttering the input and the output of the failed repeater and for re-tuning said frequency-agile-repeater to the transmitting and receiving frequencies of the failed repeater; and means, responsive to said detecting means, for associating the input and output of said frequency-agile-repeater with said receiving and transmitting antennas, respectively.

* * * * *